United States Patent [19]

Shimizu

[11] Patent Number: 4,842,090
[45] Date of Patent: Jun. 27, 1989

[54] ELECTRICALLY POWER-ASSISTED FOUR-WHEEL STEERING SYSTEM FOR VEHICLES

[75] Inventor: Yasuo Shimizu, Saitama, Japan

[73] Assignee: Honda Giken Kogyo Kabushiki Kaisha, Tokyo, Japan

[21] Appl. No.: 248,338

[22] Filed: Sep. 20, 1988

Related U.S. Application Data

[63] Continuation of Ser. No. 37,589, Apr. 13, 1987, abandoned.

[30] Foreign Application Priority Data

Apr. 23, 1986 [JP]  Japan .............................. 61-61246[U]

[51] Int. Cl.⁴ ............................................. B62D 5/04
[52] U.S. Cl. .................................. 180/140; 180/79.1; 280/91
[58] Field of Search ............... 180/140, 79.1, 148, 180/149; 280/91; 74/424.8 R, 388 PS

[56] References Cited

U.S. PATENT DOCUMENTS

| | | | |
|---|---|---|---|
| 4,186,620 | 2/1980 | Brusasco | 74/424.8 R |
| 4,408,673 | 10/1983 | Leiber | 180/148 |
| 4,415,054 | 11/1984 | Drutchas | 180/79.1 |
| 4,646,869 | 3/1987 | Kanazawa | 180/140 |
| 4,653,602 | 3/1987 | Anders | 180/79.1 |

FOREIGN PATENT DOCUMENTS

| | | | |
|---|---|---|---|
| 60-25853 | 2/1985 | Japan . | |
| 2119326 | 11/1983 | United Kingdom | 180/141 |
| 2146300 | 4/1985 | United Kingdom | 180/79.1 |
| 2148812 | 6/1985 | United Kingdom . | |

Primary Examiner—Charles A. Marmor
Assistant Examiner—Tamara L. Finlay
Attorney, Agent, or Firm—Irving M. Weiner; Joseph P. Carrier; Pamela S. Burt

[57] ABSTRACT

An electrically power-assisted four-wheel steering system (100) for vehicles with front wheels (32a, 32b) and rear wheels (48a, 48b) comprises a front-wheel steering device (35) including a rack (2) for the front wheels which transversely extends and has an end portion (2b) thereof formed with a first toothed part (2a) meshing with a first pinion (1, 1a) operatively connected to a steering wheel (27), a rear-wheel steering device (40), a linkage mechanism (50) including a second pinion (14) which meshes with a second toothed part (13) formed over a predetermined region at one side of a transversely substantially central portion of the rack to operatively transmit a transverse displacement of the rack to the rear-wheel steering device, and an electric motor (5) for operatively providing auxiliary torque to the front-wheel steering device and to the rear-wheel steering device. The motor is disposed near the rack, at a transversely substantially central location different in position from the second pinion, and has a rotating output shaft (7) disposed at another end portion (2c) of the rack. The steering system further comprises a ball and screw mechanism (10) disposed between the output shaft of the motor and the aforesaid another end portion of the rack to transmit auxiliary torque produced by the motor to the rack.

7 Claims, 2 Drawing Sheets

ELECTRICALLY POWER-ASSISTED FOUR-WHEEL STEERING SYSTEM FOR VEHICLES

This is a continuation of application Ser. No. 37,589, filed Apr. 13, 1987, now abandoned.

BACKGROUND OF THE INVENTION

1. Field of the Invention

The present invention relates generally to an electrically power-assisted four-wheel steering system for vehicles, and more particularly to an electrically power-assisted four-wheel steering system for vehicles including a front-wheel steering device of a rack and pinion type, a rear-wheel steering device mechanically connected to the rack of the front-wheel steering device, and an electric motor for operatively providing auxiliary torque to the steering devices.

2. Description of Relevant Art

The present applicant has disclosed in UK Patent Application Publication No. GBA 2148812, published June 5, 1985, a four-wheel steering system for vehicles including a front-wheel steering device of a rack and pinion type and a rear-wheel steering device mechanically connected to the rack of the front-wheel steering device. The rack has an end portion thereof formed with a first toothed part meshing with a pinion which is connected to a steering wheel. In a central portion of the rack there is formed a second toothed part meshing with another pinion that is provided at the front end of a long link which longitudinally extends at a transversely central position of the vehicle. To avoid unnecessary increase in vehicle height, the long link is accommodated in a channel formed in a rise into the passenger room, and transversely centrally positioned with respect to the vehicle. The rear end of the link is connected through a steering angle ratio changing mechanism to tie-rods and knuckles of rear wheels. The ratio changing mechanism, as well as the tie-rods and knuckles, constitutes the rear-wheel steering device. The gear ratio of this mechanism is controlled such that the rear wheels are turned in the same direction as front wheels when the vehicle speed is high, and in the opposite direction to the front wheels or in neither direction when the vehicle speed is low.

In U.S. Pat. No. 4,415,054 there is disclosed an electric power steering system for vehicles in which auxiliary torque from an electric motor is transmitted through a ball and screw mechanism to the rack of a rack and pinion type front-wheel steering device. The motor is coaxially fitted on a central part of the rack. The ball and screw mechanism consists of a screw portion spirally formed along the entire outer circumference of the central part of the rack, a ball bearing nut fitted on the screw portion and formed with a spiral groove along the inner circumference thereof, and many balls interposed between the screw portion and nut. The outer circumference of the nut is directly fixed to or indirectly connected through a clutch to an armature of the motor. Power and rotation of the motor is transmitted to the rack through the ball and screw mechanism, where the speed of rotation is reduced. One end part of the rack is formed with teeth meshing with a pinion which is connected to a steering wheel. The ball and screw mechanism transmits auxiliary torque from the motor with a small friction loss, thus permitting a smooth transmission with high efficiency.

It is desirable to combine advantages of the four-wheel steering system with those of the power steering system including the ball and screw mechanism, to thereby provide an electrically power-assisted four-wheel steering system. The rack in the front-wheel steering device of the four-wheel steering system however has in the central portion thereof the toothed part already formed to mesh with the pinion of the long link, which constitutes the difficulty of forming the screw portion of the ball and screw mechanism along the entire outer circumference of the central portion of rack.

The present invention has been achieved to overcome such a problem and effectively materialize such a desideratum as described.

SUMMARY OF THE INVENTION

An object of the present invention is to provide an electrically power-assisted four-wheel steering system for vehicles in which a front-wheel steering device has a rack meshing at a central portion thereof with a pinion for a rear-wheel steering device and also in which auxiliary torque produced by an electric motor is transmitted to the rack through a ball and screw mechanism.

To achieve such object, the present invention provides an electrically power-assisted four-wheel steering system for vehicles with front wheels and rear wheels, comprising a front-wheel steering device operatively connected to a steering wheel, the front-wheel steering device including a first pinion operatively connected to the steering wheel and a rack which extends transversely and has an end portion thereof formed with a first toothed part meshing with the first pinion, the rack being steerably connected to the front wheels, a rear-wheel steering device, a linkage mechanism operatively interconnecting the rack and the rear-wheel steering device, the linkage mechanism including a second pinion meshing with a second toothed part formed over a predetermined region at one side of a transversely substantially central portion of the rack, an electric motor for operatively providing auxiliary torque to the front-wheel steering device and the rear-wheel steering device, and a control means which is operatively connected to the motor and drives to control the motor. The motor is disposed near the rack, at a transversely substantially central location different in position from the second pinion, and has a rotating output shaft disposed at another end portion of the rack, and the steering system further comprises a ball and screw mechanism disposed between the output shaft of the motor and the aforesaid another end portion of the rack to transmit auxiliary torque produced by the motor to the rack.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
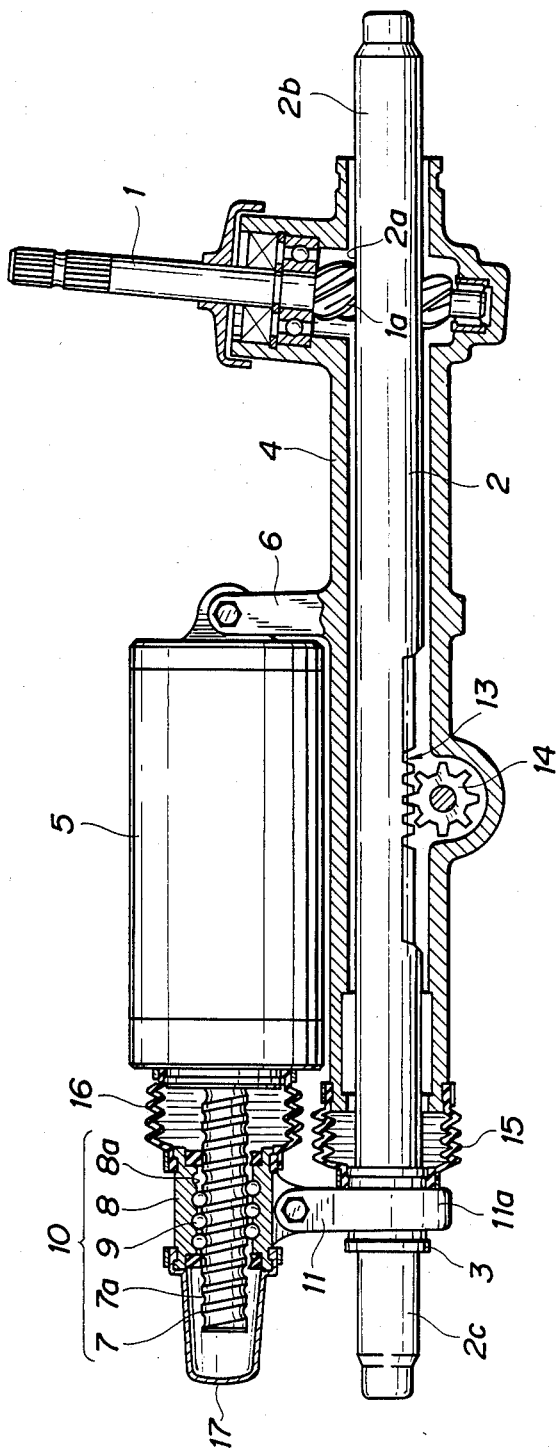
FIG. 1 is a longitudinal sectional view of an essential part of an electrically power-assisted four-wheel steering system for vehicles according to an embodiment of the invention.
Figure 2:
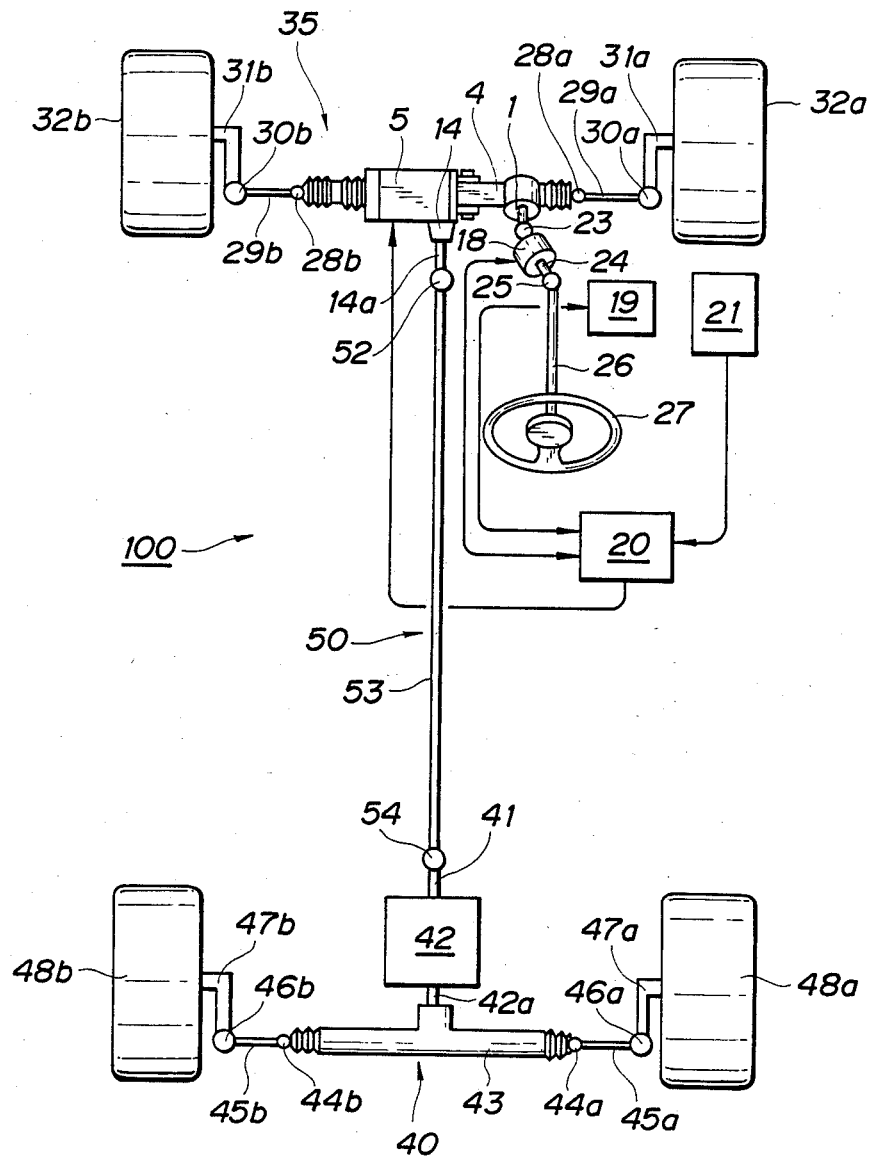
FIG. 2 is a schematic plan view of the entirety of the steering system.

Referring to FIGS. 1 and 2, designated at reference numeral 100 is the entirety of a four-wheel steering system for vehicles of an electric type according to a preferred embodiment of the present invention. As shown in FIG. 1, the system 100 includes a pinion shaft 1 rotatably supported to a housing 4. The pinion shaft 1 has at the lower end a pinion 1a formed thereon. The pinion 1a is engaged with a toothed part 2a on a right portion 2b of a transversely movably accommodated rack 2 in housing 4. The rack teeth are disposed in the right half of a vehicle, as well as a steering wheel 27. A left portion 2c of rack 2 projects from housing 4 to have an elastic member 3 fitted thereon. Member 3 is relatively hard and low in flexibility. Over the intermediate part of housing 4 there is disposed an electric motor 5 for producing auxiliary torque. The motor 5 has its axis of rotation arranged parallel to the rack 2, so that an output shaft 7 extends alongside of the left portion 2c. At the opposite end, motor 5 is pivoted on the top of an upwardly extending arm 6 formed on a substantially central part of housing 4, and swingable thereabout, though a little. The shaft 7 has a spiral groove 7a formed along the circumference thereof to the end. The groove 7a cooperates with another spiral groove 8a formed along the inner circumference of a ball bearing nut 8. The nut 8, fitted on the shaft 7, is pivotably supported at the central part thereof on the top of an arm 11 of which a ring-like lower part 11a is fitted on the elastic member 3. Rotation of nut 8 is thus restricted by the arm 11. The pivotal connection of nut 8 to arm 11 is such that a slight rocking motion is permitted. The longitudinal axis of arm 11 is perpendicular to rack 2. Between spiral grooves 7a, 8a there are installed many balls 9 which circulate through an unshown return path formed in the nut 8. A ball and screw mechanism 10 is constituted with the shaft 7, nut 8 and balls 9. The motor 5 is disposed above the rack 2 to which its power and rotation are transmitted through the ball and screw mechanism 10, where the speed of rotation is reduced. As the shaft 7 of motor 5 rotates in either direction, the nut 8 continuously moves in either corresponding sense in the axial direction of shaft 7, i.e., transversely of the vehicle (to the left or right in the Figure). In other words, the ball and screw mechanism 10 transforms the rotary auxiliary torque generated by the motor 5 into a linear auxiliary torque and then applies the same to the rack 2. The mating grooves 7a, 8a are both small in pitch, so that the rotation of shaft 7 is all the more reduced in speed when transmitted to nut 8. The transverse movement or displacement of nut 8 is transmitted through arm 11 and elastic member 3 to the rack 2, which thus receives axially assisting power at the left end thereof. To achieve a dust- and water-proof sealing, a pair of boots 15, 16 of a bellows form are put between the left end of housing 4 and elastic member 3 and between the left end of motor 5 and the right end of nut 8, respectively. At the left end of nut 8 there is provided a dust cover 17 surrounding the tip of shaft 7.

The rack 2 has, at a substantially central position thereof in the transverse direction of the vehicle, a toothed part 13 cut in a transversely symmetrical manner within a predetermined region on its lower surface. The toothed part 13 is engaged with a pinion 14 rotatably accommodated in housing 4. The pinion 14 is connected to a long shaft 53 of a linkage 50 longitudinally extending at a transversely central position of the vehicle. The linkage 50 is thus mechanically interconnected with rack 2 so that an axial motion of the rack 2 is transmitted to a rear-wheel steering device 40 of a rack and pinion type.

As shown in FIG. 2, the rack 2 is connected at the external end parts 2b, 2c through ball joints 28a, 28b to right and left tie rods 29a, 29b, respectively. The tie-rods 29a, 29b are connected at the outer ends thereof through ball joints 30a, 30b to knuckles 31a, 31b of front wheels 32a, 32b, respectively. The pinion shaft 1 is interconnected with the steering wheel 27 through a joint 23, an intermediate shaft 24, another joint 25, and a steering shaft 26. A front-wheel steering device 35 of a rack and pinion type consists of the pinion shaft 1, rack 2, tie-rods 29a, 29b, knuckles 31a, 31b and those members cooperating with them. The steering device 35 is connected to the steering wheel 27 through the members 23 to 26.

The steering system 100 comprises the front-wheel steering device 35 and the rear-wheel steering device 40 interconnected through the linkage 50. The shaft 53 of the linkage 50 is connected at the front end through a universal joint 52 to a shaft 14a of the pinion 14. The rear end of shaft 53 is connected through a universal joint 54 to an input shaft 41 of a gear ratio changing mechanism 42 of the rear-wheel steering device 40. A transverse linear motion of rack 2 is converted into a rotary motion to be transmitted through linkage 50 to the input shaft 41 of mechanism 42. An output shaft 42a of the mechanism 42 is inserted into a housing 43, where the rear end of shaft 42a is provided with an unshown pinion meshing with an unshown rack which extends in the transverse direction of the vehicle. The rack is connected at both ends thereof through ball joints 44a, 44b to right and left tie-rods 45a, 45b, respectively. The tie-rods 45a, 45b are connected at the outer ends thereof through ball joints 46a, 46b to knuckles 47a, 47b of rear wheels 48a, 48b, respectively. The rear-wheel steering device 40 consists of the gear ratio changing mechanism 42, the rack in housing 43, tie-rods 45a, 45b, knuckles 47a, 47b and those members cooperating with them.

The motor 5 is governed by a control device 20 of which power is supplied from a battery 21. The control device 20 is fed with detection signals from a steering operation sensor 18 on the intermediate shaft 24 and a vehicle speed sensor 19 on an unshown speedometer cable. The sensor 18 includes an unshown torque sensing element of a strain gauge type for detecting steering torque and an unshown angular velocity sensing element for detecting steering speed. The element for steering-speed detection may comprise an electric generator of which the rotation corresponds to that of the shaft 24. The motor 5 is driven by the control device 20 in dependence on the magnitude and acting direction of steering torque as detected, so as to produce auxiliary torque of which the magnitude is relatively large when the vehicle speed is low and becomes smaller as the vehicle speed increases, while the steering speed also is taken into consideration.

In the steering system 100, when steering wheel 27 is rotated, pinion 1a meshing with the first rack teeth 2a causes rack 2 to transversely slide, turning front wheels 32a, 32b. Concurrently, pinion 14 meshing with the second teeth 13 of rack 2 converts an axial dsiplacement of the rack 2 into an angular displacement to be transmitted through linkage 50 to gear ratio changing mechanism 42 of rear-wheel steering device 40, properly turning rear wheels 48a, 48b. The mechanism 42 is similar in structure and function to that one disclosed in the UK Publication No. GBA 2148812. The rear wheels 48a, 48b are thus turned in the same direction as the front wheels 32a, 32b when the vehicle speed is high, and in the opposite direction to the front wheels 32a, 32b or in neither direction when the vehicle speed is low. While the steering wheel 27 is operated, the motor 5 is driven by the control device 20 to provide the rack 2 with assist power, as described. As a result, necessary steering force is desirably reduced at low vehicle speeds, whereas an ordinary road grip feeling is restored as the vehicle speed increases.

Auxiliary torque produced at the motor 5 is transmitted to rack 2 through the ball and screw mechanism 10 which has a small friction loss and permits a smooth transmission with an increased efficiency.

The ball and screw mechanism 10 is disposed at the output side of motor 5, which eliminates the need of an additional spiral groove to be formed in the rack itself, thus permitting a shorter dimension to be employed as the rack length.

The motor 5 is located at a substantially central position of rack housing 4 in the transverse direction of the vehicle and has the output shaft 7 leftwardly projected. Auxiliary torque from motor 5 is given through ball and screw mechanism 10 to the left end part 2c of rack 2. The right end part 2b of rack 2 is given steering torque from pinion 1a connected to the steering wheel 27. Rack 2 is thus preferably balanced with respect to the reception of steering and auxiliary torque.

The pinion 14 of linkage 50 meshes with teeth 13 at the lower surface of rack 2, while the motor 5 is disposed on the upper surface of same. Motor 5 is thus arranged opposite to pinion 14, with respect to the rack 2, which permits an effective utilization of given space, with the possibility of giving a compact size to the system 100.

The described control system of motor 5 is not restrictive and may be modified in an arbitrary manner, as understood by an ordinary artisan.

Although there has been described what is at present considered to be the preferred embodiment of the invention, it will be understood that the present invention may be embodied in other specific forms without departing from the spirit or essential characteristics thereof. The present invention is therefore to be considered in all respects as illustrative, but not restrictive. The scope of the invention is indicated by the appended claims rather than by the foregoing description.

I claim:

1. An electrically power-assisted four-wheel steering system for vehicles with front wheels and rear wheels, comprising:
    a front-wheel steering device operatively connected to a steering wheel, said front-wheel steering device including a first pinion operatively connected to said steering wheel and a rack which extends transversely and has an end portion thereof formed with a first toothed part meshing with said first pinion, said rack being steerably connected to said front wheels;
    a rear-wheel steering device;
    a linkage mechanism operatively interconnecting said rack and said rear-wheel steering device, said linkage mechanism including a second pinion meshing with a second toothed part formed over a predetermined region at one side of a transversely substantially central portion of said rack;
    an electric motor for operatively providing auxiliary torque to said front-wheel steering device and said rear-wheel steering device; and
    a control means which is operatively connected to said motor and drives to control said motor, wherein:
    said motor is connected to said front-wheel steering device near said rack, at another side of the transversely substantially central portion of said rack different in position from said one side thereof, and has a rotating output shaft disposed at another end portion of said rack;
    said steering system further comprises a ball and screw mechanism disposed between said output shaft of said motor and said another end portion of said rack to transmit auxiliary torque produced by said motor to said rack;
    said ball and screw mechanism comprises said output shaft of said motor, said output shaft being formed with a spiral groove, a ball bearing nut fitted on said output shaft and formed along an inner circumference thereof with a spiral groove cooperating with said spiral groove of said output shaft, and balls interposed between said spiral grooves so that said nut moves in the axial direction of said output shaft as said output shaft rotates; and
    said output shaft of said motor is arranged substantially parallel to said rack so that torque of said output shaft is converted through said nut of said ball and screw mechanism to be exerted on said rack as assisting power in the axial direction of said rack.

2. A steering system according to claim 1, wherein: said motor and said second pinion are arranged at opposite sides of said rack.

3. A steering system according to claim 1, wherein: said steering system further comprises a rack housing for rotatably supporting said first pinion and said second pinion and axially movably supporting said rack; and
    said motor is installed at a transversely substantially central portion of said rack housing.

4. A steering system according to claim 1, wherein: said ball and screw mechanism is slightly pivotably connected to said rack through an elastic member which is relatively hard and low in flexibility.

5. An electrically power-assisted four-wheel steering system for vehicles with front wheels and rear wheels, comprising:
    a front-wheel steering device operatively connected to a steering wheel, said front-wheel steering device including a first pinion operatively connected to said steering wheel and a rack which extends transversely and has an end portion thereof formed with a first toothed part meshing with said first pinion, said rack being steerably connected to said front wheels;
    a rear-wheel steering device;
    a linkage mechanism operatively interconnecting said rack and said rear-wheel steering device, said linkage mechanism including a second pinion meshing with a second toothed part formed over a predetermined region at one side of a transversely substantially central portion of said rack;

an electric motor for operatively providing auxiliary torque to said front-wheel steering device and said rear-wheel steering device; and a control means operatively connected to said motor for controlling said motor, wherein:

said motor is connected to said front wheel steering device near said rack, at another side of said transversely substantially central portion of said rack different in position from said one side thereof, and has a rotating output shaft disposed at another end portion of said rack;

said steering system further comprises a ball and screw mechanism disposed between said output shaft of said motor and said another end portion of said rack to transmit auxiliary torque produced by said motor to said rack;

said ball and screw mechanism being slightly pivotably connected to said rack;

said ball and screw mechanism comprises said output shaft of said motor, said output shaft being formed with a spiral groove, a ball bearing nut fitted on said output shaft and formed along an inner circumference thereof with a spiral groove cooperating with the spiral groove of said output shaft, and balls interposed between said spiral grooves so that said nut moves in the axial direction of said output shaft and said output shaft rotates; and said output shaft of said motor is arranged substantially parallel to said rack so that torque of said output shaft is converted through said nut of said ball and screw mechanism to be exerted on said rack as assisting power in the axial direction of said rack.

6. A steering system according to claim 5, wherein:

said steering system further comprises a rack housing for rotatably supporting said first pinion and second pinion and axially movably supporting said rack;

said motor is installed at a transversely substantially central portion of said rack housing; and said motor is rockable relative to the rack housing.

7. A steering system according to claim 5, wherein:

said ball and screw mechanism is slightly pivotably connected to said rack through an elastic member which is relatively hard and low in flexibility.

* * * * *

UNITED STATES PATENT AND TRADEMARK OFFICE
CERTIFICATE OF CORRECTION

PATENT NO. : 4,842,090

DATED : June 27, 1989

INVENTOR(S) : Yasuo SHIMIZU

It is certified that error appears in the above-identified patent and that said Letters Patent is hereby corrected as shown below:

Column 4, line 65, correct the spelling of --displacement--.

Signed and Sealed this

Nineteenth Day of June, 1990

Attest:

HARRY F. MANBECK, JR.

*Attesting Officer*    Commissioner of Patents and Trademarks